June 20, 1944.  A. E. ANDERSON  2,351,652
WASHING OF FILTER BAGS
Filed Sept. 13, 1941  2 Sheets-Sheet 1

Inventor
*Arvid E. Anderson.*
By *R. S. A. Dougherty*
Attorney

June 20, 1944.  A. E. ANDERSON  2,351,652
WASHING OF FILTER BAGS
Filed Sept. 13, 1941  2 Sheets-Sheet 2
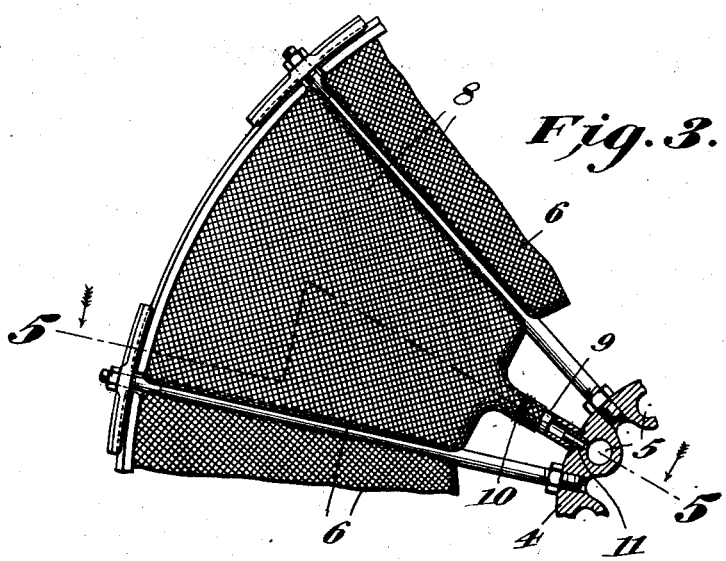
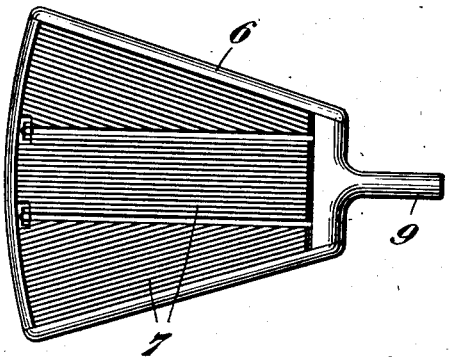
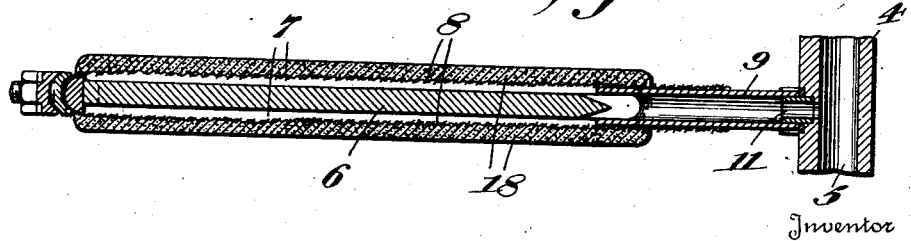
Inventor
Arvid E. Anderson.
By R. S. A. Dougherty.
Attorney Patented June 20, 1944

2,351,652

UNITED STATES PATENT OFFICE 2,351,652

WASHING OF FILTER BAGS

Arvid E. Anderson, Cornwall, Pa., assignor to Bethlehem Steel Company, a corporation of Pennsylvania Application September 13, 1941, Serial No. 410,655

7 Claims. (Cl. 210—200)

This invention relates to the cleaning of filtering surfaces and more particularly to the washing of the cloth bags of a continuous vacuum filter in place with a solution of tri-sodium phosphate.

In most concentration plants, for the treating of fine iron ores, it is necessary to make considerable use of continuous vacuum filters, the so-called American disc filter being the type most generally used.

With a typical installation, as much copper as possible is first removed by flotation from the ore in a froth concentrate, which is discharged through a launder into the mill tailings. Tailings from the flotation machines pass over a thickener magnet, and the resultant magnetic concentrate is discharged to the continuous vacuum filter for dewatering.

It is also standard practice to use this or similar procedure in connection with the flotation of pyrite and chalcopyrite.

Vacuum filters in general are based upon the principle of separating fluid from solids by suction of the fluids through one or more porous membranes, and usually consist of rotating drums or discs covered with cloth and partially immersed in the material to be filtered. Suction is applied to the immersed portion to cause flow of filtrate into piping within the rotating drums or discs, and pressure is applied to each part of the revolving filtering surface as it comes in front of a special stationary section, thus permitting the cake of solids to be blown or scraped from the filtering surface into a hopper or onto a belt conveyor or the like. A special valve system causes the change at predetermined positions from suction to pressure and back to suction again.

The perfect filter surface would be completely impervious to solids while absolutely porous to fluids. Since this is really unattainable, about 10 per cent of fluid may be expected to remain in the concentrate and a portion of the finer particles will be sucked through the cloth with the fluid. Being of a rather sooty and greasy nature, moreover, these particles have a strong tendency to adhere to the inside of the filtering fibers, and in a relatively short time thus will close the pores of the cloth from within.

It is obvious that the speed and efficiency of the filter are reduced in direct proportion to the amount of clogging of the cloth. Heretofore, it has been ordinary but expensive and time-consuming practice to stop the filter and replace the cloths whenever this occurs.

Attempts to clean the filter cloths in place by scrubbing have failed to remove completely the stubbornly adhering colloidal particles within, which are at the root of the trouble, and have also been unduly laborious and productive of wear on the cloths. Washing in place with clean water has also been unsuccessful.

One object of my invention is therefore a solution for cleaning filter cloths in a continuous vacuum filter or the like.

Another object is a solution for cleaning filter bags in place in an American disc filter.

Another object is a method of cleaning filter cloths in a continuous vacuum filter or the like.

Still another object is a method of cleaning filter cloths in place in an American disc filter.

Other objects, purposes and advantages of my invention will appear in the following pages of specification and claims, and to make the said invention more clear, I shall now refer to the annexed two sheets of drawings forming a part of this specification and in which like characters of reference indicate like parts.

The type of continuous vacuum filter illustrated in the drawings is the so-called American disc filter, similar to the filters described, for example, in the patents to O. J. Salisbury, No. 1,259,139, dated March 12, 1918, and A. L. Genter, No. 1,538,980, dated May 26, 1925. It should be understood, however, that the chemical solution and method herein described are adaptable, with only such slight and obvious changes as are needed to fit the particular design of filter, to any other type of vacuum filter desired.

Fig. 3 is an enlarged detail view of a unit or sector of the disc shown in Fig. 2;

Fig. 4 is a side elevation of a similar sector from which the cloth covering has been removed; and Fig. 5 is a cross-sectional view of a covered sector taken along the lines 5—5 of Fig. 3.

Figure 1:
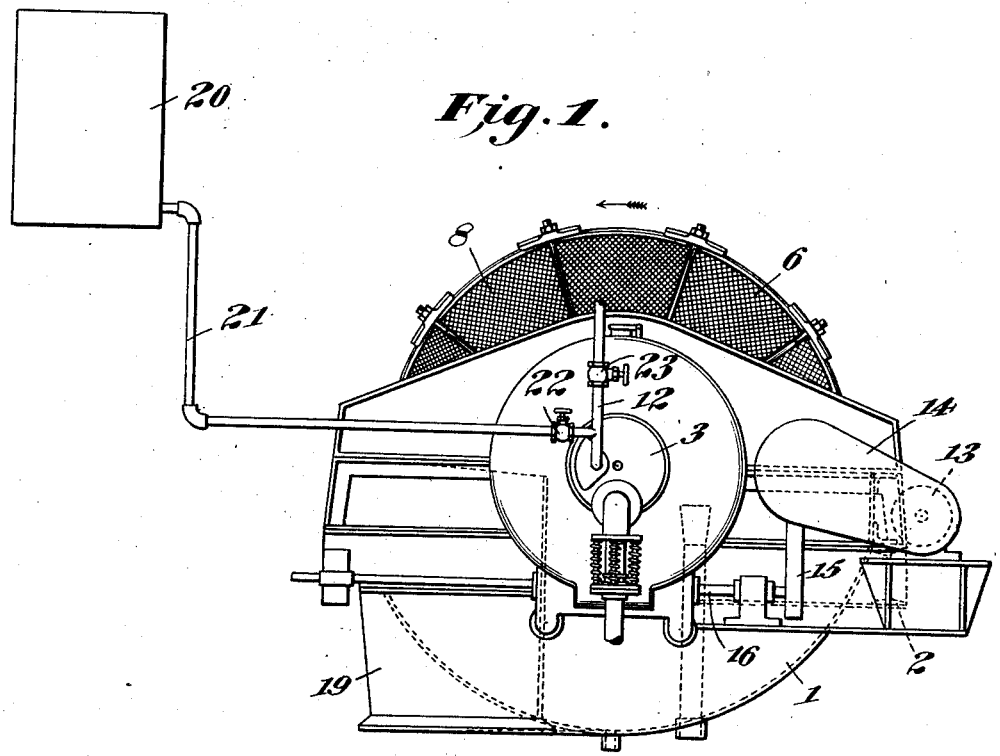
Figure 1 is an end view of an American disc filter, showing the drive end of the filter and tank and piping connections for my cleaning solution.
Figure 2:
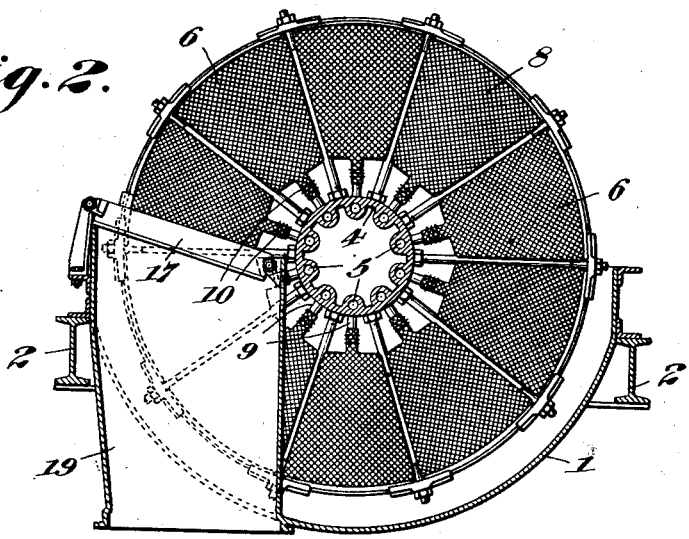
Fig. 2 is a section of the apparatus showing a typical covered disc of the same.

The American filter illustrated is provided with crenelated filter tank 1 for containing the material to be filtered and is firmly supported on I-beams 2 or the like. Rotatably mounted on main bearings 3 therein in a horizontal position is the large hollow center shaft 4, cast with a number of cored filtrate channels 5 uniformly spaced about and parallel to the shaft axis.

Each individual fan-shaped filtering unit or "sector" 6, shown uncovered in Figure 4, is provided with grooves or corrugations 7 for the passage of the filtrate, though the actual filtering medium of each sector consists of a bag of cloth 8 so constructed that it may be slipped on over the sector and fastened to tubular portion 9 by wrapping with the cord 10. The completed sector is joined to the center shaft 4 by screwing said tubular portion 9 onto a conventional nipple 11 inserted in a hole in the shaft opening into one of the filtrate channels 5. Ten of these sectors comprise a complete filter disc, and the entire machine may be designed to accommodate any number of discs desired.

Through filtrate channels 5 a conventional perforated disc valve (not shown) applies vacuum and withdraws filtrate, then admits compressed air from pipe 12, at appropriate points in the filtering operation.

The filter is driven by a motor 13 connected through a speed reducer 14 and belt 15 to a driveshaft 16, and worm gears (not shown) to the center shaft. Deflector 17 discharges the accumulated cake 18 into hopper 19.

In ordinary operation, the discs under vacuum are slowly revolved counter-clockwise through the material to be filtered in the filter tank 1, building up a cake of solids 18 on each side of the immersed sectors. The filtrate passes through the cloth 8, along the drainage grooves 7, into the filtrate channels 5 and through the perforated disc valve for disposal.

As each sector emerges from the filter tank 1, the vacuum is kept on in the sector to dry the cake, until the sector reaches the discharge position. The perforated disc valve then cuts off the vacuum, and opens onto air pipe 12 to inflate the bag with air at very low pressure, usually under one pound to the square inch. While the slightly bulging filter bag moves downward between the parallel edges of the deflector 17, the cake 18 is scraped from the cloth bag 8 and drops into hopper 19. After passing the discharge position, the air is released from the bag and the vacuum re-applied as it submerges again below the feed level in the filter tank.

Having thus described the conventional operation of the filter, I shall now describe my system of removing the fine clinging matter which clogs the filter cloths.

A very effective solution for cleaning filter cloths is made by dissolving approximately 12 to 15 pounds of tri-sodium phosphate ($Na_3PO_4$) to each 40 gallons of water, or by weight about one part of tri-sodium phosphate to from 22 to 28 parts of water.

The best way to apply this solution is to blow it through the cloth by the air pressure used during the filter operation. This requires, for the filter illustrated, the addition of a tank 20 to contain the solution set high enough above the filter so that the solution will flow by gravity, a pipe 21 and valve 22 to conduct the solution to air pipe 12, and a valve 23 on said air pipe 12.

To clean the filter bags, the filter is kept rotating but the vacuum is turned off. Valves 22 and 23 are opened, the solution enters the filter bags with the air and is blown through the bags to clean the inside of the cloth. A finishing wash or rinse of clear water is then given the cloths to remove excess solution. It is important that both the tri-sodium phosphate solution and the wash water be thoroughly removed from the filter before it is again placed in operation.

In comparative operating tests, cloths washed at regular intervals with the tri-sodium phosphate solution had about 40 per cent longer life than unwashed cloths, with a slightly smaller amount of moisture remaining in the filter cake. Over a working period of 845 hours, during which the filter cloths were washed nine times, 102 filter bags were used, the concentrate averaging 9.13 per cent moisture, while in 760 hours of operation without washing, 129 bags were required to produce a concentrate with an average moisture of 9.38 per cent.

Although I have shown this invention in considerable detail, I do not wish to be limited strictly to the exact and specific materials and details shown and described, but may use with any standard filter such substitutions, modifications or equivalents thereof as are embraced within the scope of the invention or as are pointed out in the appended claims.

Having thus fully described my invention, what I claim as new and useful and desire to secure by Letters Patent is:

1. In the concentration of fine iron ores, the method of cleaning a filter fabric which consists in subjecting the same to a cold solution of tri-sodium phosphate and water in the proportion by weight of approximately one part of tri-sodium phosphate to twenty-two to twenty-eight parts of water.

2. In the concentration of fine iron ores, the method of cleaning a filter fabric which consists in subjecting the same to a cold solution of tri-sodium phosphate and water in the proportion of approximately twelve to fifteen pounds of tri-sodium phosphate to forty gallons of water, and then rinsing with clear water.

3. The method of cleaning filter cloths which have become clogged with fine solid particles of iron ores, which comprises circulating a cold tri-sodium phosphate solution in the proportion by weight of approximately one part of tri-sodium phosphate to twenty-two to twenty-eight parts of water through said cloths in situ, and then washing with water.

4. The method of cleaning cloths in a vacuum filter which have become clogged with fine iron-containing material which comprises blowing by air pressure a cold solution of approximately one part tri-sodium phosphate in twenty-two to twenty-eight parts of water through said filter cloths in situ, and then applying a water rinse.

5. The method of cleaning filter cloths in a continuous suction filter which have become clogged on the inside with fine iron ore particles drawn in by suction, which comprises discontinuing the suction, blowing by compressed air a cold solution of approximately one part tri-sodium phosphate in twenty-two to twenty-eight parts of water through said filter cloths in situ, and then applying a water rinse.

6. In combination with a continuous rotary suction filter for dewatering iron ore concentrates and having an air pressure line for separating the filter cake from the filter elements, a tank containing a cold solution of approximately one part tri-sodium phosphate in twenty-two to twenty-eight parts of water, a pipe connecting said tank with the air pressure line and valves on said air pressure line and pipe to regulate the admission of said solution to the filter.

7. A solution for cleaning an iron ore clogged filter fabric, which comprises a cold solution of tri-sodium phosphate, by weight one part, in twenty-two to twenty-eight parts of water.

ARVID E. ANDERSON.